US010665251B1

(12) United States Patent
Wood, III et al.

(10) Patent No.: US 10,665,251 B1
(45) Date of Patent: May 26, 2020

(54) MULTI-MODAL ANOMALY DETECTION

(71) Applicant: INTERNATIONAL BUSINESS MACHINES CORPORATION, Armonk, NY (US)

(72) Inventors: David Alvra Wood, III, Scarsdale, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/286,673

(22) Filed: Feb. 27, 2019

(51) Int. Cl.
| H04R 29/00 | (2006.01) |
| G10L 25/51 | (2013.01) |
| G01M 15/02 | (2006.01) |
| G06F 16/901 | (2019.01) |

(52) U.S. Cl.
CPC .............. *G10L 25/51* (2013.01); *G01M 15/02* (2013.01); *G06F 16/9024* (2019.01)

(58) Field of Classification Search
CPC ..... G10L 25/51; G06F 16/9024; G01M 15/02
See application file for complete search history.

(56) References Cited

U.S. PATENT DOCUMENTS

| 8,938,404 | B2 | 1/2015 | Capman |
| 9,025,779 | B2 | 5/2015 | Ramalho |
| 9,586,314 | B2 | 3/2017 | Bruemmer |
| 9,886,625 | B2 | 2/2018 | Wnuk |
| 9,892,744 | B1* | 2/2018 | Salonidis ........... G05B 23/0237 |
| 10,083,523 | B2 | 9/2018 | Versace |
| 2006/0033625 | A1 | 2/2006 | Johnson |
| 2009/0195401 | A1 | 8/2009 | Maroney |
| 2012/0066519 | A1* | 3/2012 | El-Essawy ........... H05K 7/1492 |
| | | | 713/300 |
| 2012/0185418 | A1 | 7/2012 | Capman |
| 2013/0039497 | A1 | 2/2013 | Ramalho |

(Continued)

FOREIGN PATENT DOCUMENTS

WO    2014057496 A2    4/2014

OTHER PUBLICATIONS

Park et al., "A Multimodal Anomaly Detector for Robot-Assisted Feeding Using an LSTM-based Variational Autoencoder", arXiv:1711. 00614v1 [cs.RO] Nov. 2, 2017, 8 pages.

(Continued)

*Primary Examiner* — Simon King
(74) *Attorney, Agent, or Firm* — Sean M. Douglass

(57) ABSTRACT

An embodiment of the invention may include a method, computer program product and computer system for multi-modal anomaly detection. The method, computer program product and computer system may include computing device which may receive primary sensor data from a primary sensor for a first device and determining a baseline from the primary sensor data for the first device. The computing device may receive primary sensor data from a primary sensor and secondary sensor data from a secondary sensor for a second device. The computing device may determine an anomaly in the primary sensor data for the second device based on the determined baseline for the first device and compare the anomaly in the primary sensor data for the second device to the received secondary sensor data for the second device.

20 Claims, 9 Drawing Sheets

(56) References Cited

U.S. PATENT DOCUMENTS

| | | | |
|---|---|---|---|
| 2015/0039401 A1* | 2/2015 | Ricketts | G06Q 10/06393 705/7.39 |
| 2015/0065121 A1* | 3/2015 | Gupta | H04W 24/08 455/424 |
| 2018/0204002 A1 | 7/2018 | Khorrami | |
| 2018/0211426 A1 | 7/2018 | Cantwell | |
| 2018/0287907 A1* | 10/2018 | Kulshreshtha | H04L 41/064 |
| 2019/0389599 A1* | 12/2019 | Dillard | G01D 18/00 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

MULTI-MODAL ANOMALY DETECTION

BACKGROUND

The present invention relates generally to a method, system, and computer program for multi-modal anomaly detection. More particularly, the present invention relates to a method, system, and computer program for detecting an anomaly in a device using multiple sensors.

Anomaly detection on machine sounds has many applications in diagnosis and maintenance of machine systems. These include using the anomalies in sounds to troubleshoot problems, keep track of device status and improve maintenance. For example, in using audio analytics to look for abnormal sounds from an engine, a microphone can detect anomalies in the sound after a period of base-line training.

BRIEF SUMMARY

An embodiment of the invention may include a method, computer program product and computer system for multi-modal anomaly detection. The method, computer program product and computer system may include computing device which may receive primary sensor data from a primary sensor for a first device and determining a baseline from the primary sensor data for the first device. The computing device may receive primary sensor data from a primary sensor and secondary sensor data from a secondary sensor for a second device. The computing device may determine an anomaly in the primary sensor data for the second device based on the determined baseline for the first device and compare the anomaly in the primary sensor data for the second device to the received secondary sensor data for the second device. The computing device may compare the anomaly in the primary sensor data for the second device to the received secondary sensor data for the second device by creating an anomaly dependency graph, which captures the relationships between the anomaly in the primary sensor data and the secondary sensor data. The computing device may compare in response to detecting an anomaly in the secondary sensor data for the second device the anomaly in the primary sensor data of the second device to the anomaly in the secondary sensor data for the second device and suppress the primary sensor in response to determining that the anomaly in the secondary sensor data does not support the anomaly in the primary sensor data for the second device. The computing device may generate a notification indicating no anomaly was found for the second device. The computing device may compare in response to detecting an anomaly in the secondary sensor data for the second device the anomaly in the primary sensor data of the second device to the anomaly in the secondary sensor data for the second device and generate a notification that an anomaly was found in the second device in response to determining that the anomaly in the secondary sensor data does support the anomaly in the primary sensor data for the second device. The computing device may generate a notification that an anomaly was found in the second device in response to determining that no anomaly was detected in the secondary sensor data for the second device.

BRIEF DESCRIPTION OF THE DRAWINGS

FIG. 1b illustrates example operating modules of the multi-modal anomaly detection program of FIG. 1a.

DETAILED DESCRIPTION

Figure 1A:
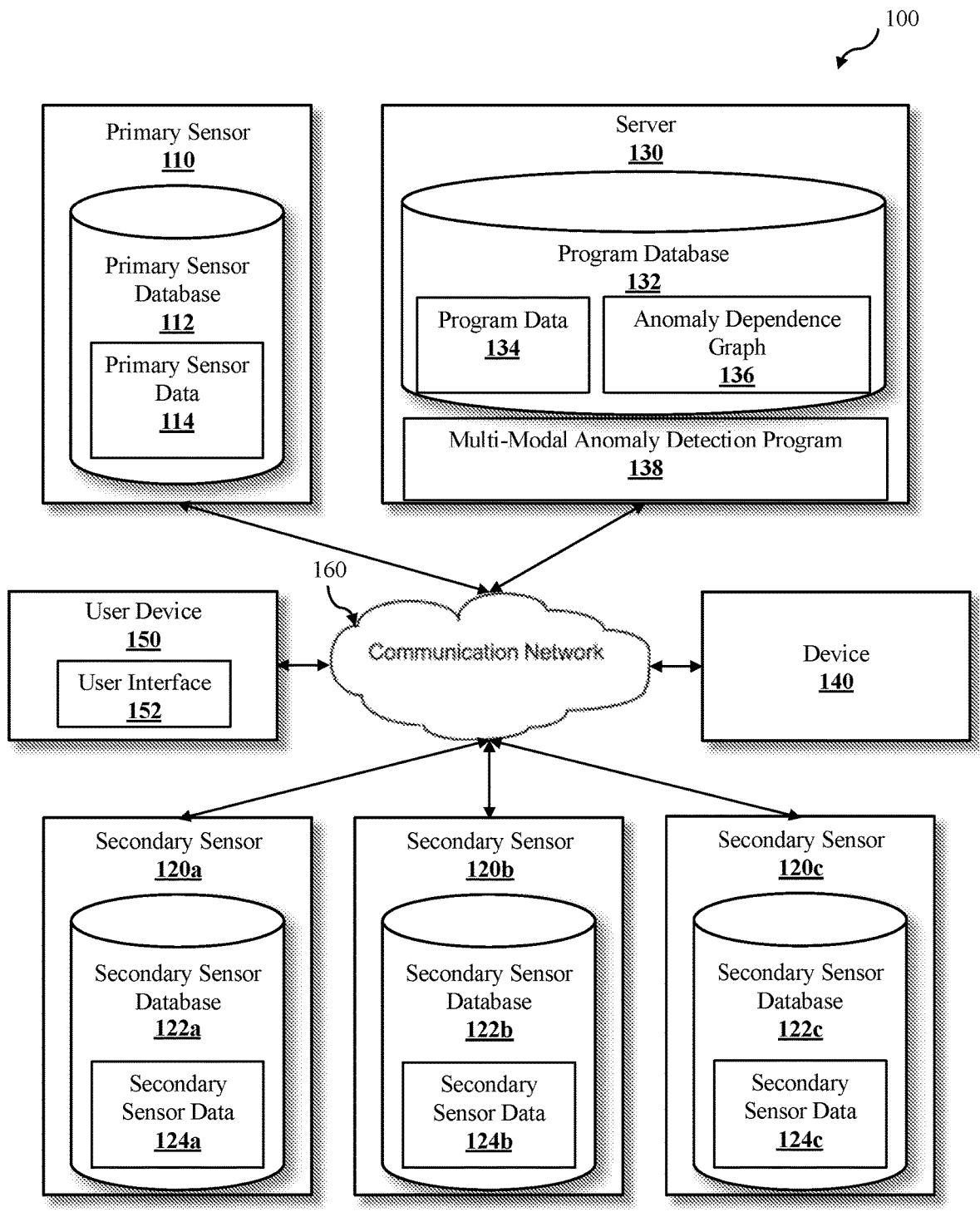
FIG. 1a illustrates a system for multi-modal anomaly detection, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for multi-modal anomaly detection in a device. More particularly, the present invention relates to a method, system, and computer program for detecting an anomaly in a device using multiple sensors. Current technology uses audio analytics to look for abnormal sounds from a device, for example, an engine. In current systems a microphone can detect anomalies in the sound after a period of base-line training. However, even after training, the audio source may report anomalies based on many different types of scenarios, e.g. if a pair of workers were to hold a conversation in front of the micro-phone, or if a furniture is moved in the engine room. These scenarios generate spurious anomalous events, which is undesirable.

Accordingly, a need exists for a multi-modal anomaly detection system which eliminates or reduces spurious anomalous events. The objective of the current disclosure is to create a system which has a much smaller rate of spurious event detection. We achieve this goal by means of combining audio with multiple other supporting modalities, using the results from the supporting modalities to eliminate the large number of anomalous devices of this nature.

Reference will now be made in detail to the embodiments of the present invention, examples of which are illustrated in the accompanying drawings, wherein like reference numerals refer to like elements throughout. Embodiments of the invention are generally directed to a system for multi-modal anomaly detection in a device.

FIG. 1 illustrates a multi-modal anomaly detection system 100, in accordance with an embodiment of the invention. In an example embodiment, multi-modal anomaly detection system 100 includes a primary sensor 110, secondary sensors 120a-c, a server 130, a device 140, and a user device 150, interconnected via a network 160.

In the example embodiment, the network 160 is the Internet, representing a worldwide collection of networks and gateways to support communications between devices connected to the Internet. The network 160 may include, for example, wired, wireless or fiber optic connections. In other embodiments, the network 160 may be implemented as an intranet, a local area network (LAN), or a wide area network (WAN). In general, the network 160 can be any combination of connections and protocols that will support communications between the primary 110, secondary sensors 120a-c, the server 130, the device 140, and the user device 150.

The primary sensor device 110 may include the primary sensor database 112. The primary sensor 110 may be any device capable of capturing the primary sensor data 114. The primary sensor data 114 may include, but is not limited to, visual, audio, textual data, and/or physical data. In an embodiment, the primary sensor 110 may be, but is not limited to, an audio device and/or acoustic detection system capable of capturing the primary sensor data 114, i.e. audio input, from the device 140 and/or audio input from around the device 140. In an example embodiment, the primary sensor 110 receives input, such as but not limited to, textual, visual, audio, or physical input received from the device 140. In the example embodiment, the primary sensor 110 may be an audio device, an imaging device, a pressure detecting device, a door sensor device, a temperature detecting device, light detecting device, a motion detecting device, an accelerometer, etc., or any other device capable of capturing, storing, and/or compiling visual, audio, textual data, and/or physical data and sending that visual, audio, textual data, and/or physical data to and from other devices, such as the secondary sensors 120a-120c, the server 130, the device 140, and the user device 150, via the network 160. While only a single primary sensor 110 is depicted, it can be appreciated that any number of primary sensors may be part of the multi-modal anomaly detection system 100. The primary sensor 110 is described in more detail with reference to FIG. 4.

The primary sensor database 112 may store the primary sensor data 114, i.e. the visual, audio, textual data, and/or physical data, captured by the primary sensor 110. The primary sensor database 112 may be any storage media capable of storing data, such as, but not limited to, storage media resident in the primary sensor 110 and/or removeable storage media. For example, the primary sensor database 112 may be, but is not limited to, a hard drive, a solid stated drive, a USB drive, or a memory card, etc. The primary sensor database 112 is described in more detail above and with reference to FIG. 4.

The secondary sensors 120a-120c may include secondary sensor databases 122a-122c. The secondary sensors 120a-120c may be any device capable of capturing the secondary sensor data 124a-124c. The secondary sensor data 124a-124c may include, but is not limited to, visual, audio, textual data, and/or physical data. In an embodiment, the secondary sensors 120a-120c may be, but are not limited to, an audio device, an imaging device, a pressure detecting device, a door sensor device, a temperature detecting device, light detecting device, a motion detecting device, an accelerometer, etc. capable of capturing the secondary sensor data 124a-124c from the device 140 and/or from around the device 140. For example, the secondary sensor 120a may be, but it not limited to, a video camera capable of capturing video input, i.e. secondary sensor data 124a, of the device 140 and/or the surrounding of the device 140. The secondary sensor 120b may be for example, but not limited to, a door sensor capable of detecting whether one or more doors providing access to a room the device 140 is located in are open or closed. The secondary sensor 120c may be for example, but not limited to, a presence detector capable of detecting whether there are people and/or objects in a room containing the device 140 using for example, but not limited to, passive infrared (PIR) sensors, microwave sensors, ultrasonic sensors, tomographic motion detectors, video cameras, or gesture detectors, etc. In the example embodiment, the secondary sensor devices 120a-120c receive input, such as but not limited to, textual, visual, audio, or physical input received from the device 140 and/or the area around the device 140. In an example embodiment, the secondary sensor devices 120a-120c may be an audio device, an imaging device, a pressure detecting device, a door sensor device, a temperature detecting device, light detecting device, a motion detecting device, an accelerometer, etc., or any other device capable of capturing, storing, and/or compiling visual, audio, textual data, and/or physical data and sending that visual, audio, textual data, and/or physical data to and from other devices, such as the primary sensor 110, the server 130, the device 140, and the user device 150, via the network 160. While three secondary sensors 120a-120c are depicted it can be appreciated that the multi-modal anomaly detection system 100 may include any number of secondary sensors including fewer than three secondary sensors 120 or more than three secondary sensors. The secondary sensors 120a-120c are described in more detail with reference to FIG. 4.

The secondary sensor databases 122a-122c may store the secondary sensor data 124a-124c, i.e. the visual, audio, textual data, and/or physical data, captured by the secondary sensors 120a-120c. The secondary sensor databases 122a-122c may be any storage media capable of storing data, such as, but not limited to, storage media resident in the secondary sensors 120a-120c and/or removeable storage media. For example, the secondary sensor databases 122a-122c may be, but are not limited to, a hard drive, a solid stated drive, a USB drive, or a memory card, etc. The secondary sensor databases 122a-122c are described in more detail above and with reference to FIG. 4.

The server 130 may include the program database 132 and the multi-modal anomaly detection program 138. In the example embodiment, the server 130 may be a desktop computer, a notebook, a laptop computer, a tablet computer, a thin client, or any other electronic device or computing system capable of storing compiling and organizing audio, visual, or textual content and receiving and sending that content to and from other devices, such as the primary sensor 110, the secondary sensors 120a-120c, the device 140, and the user device 150, via the network 160. In some embodiments, the server 130 includes a collection of devices, or data sources, in order to collect the program data 134. The server 130 is described in more detail with reference to FIG. 3.

The program database 132 may store the program data 134. The program database 132 may be any storage media capable of storing data capable of storing data, such as, but not limited to, storage media resident in the server 130 and/or removeable storage media. For example, the program database 132 may be, but is not limited to, a hard drive, a solid stated drive, a USB drive, or a memory card, etc. The program database 132 is described in more detail above and with reference to FIG. 3.

The program data 134 may be a collection of data and input including, but not limited to, audio, visual, textual, and physical data. The program data 134 may include, for example, the primary sensor data 114 and the secondary sensor data 124a-124c received and/or collected from the primary sensor 110 and/or the secondary sensors 120a-120c. The program data 134 may also include the anomaly dependency graph 136. While only a single anomaly dependency graph 136 is shown, the program data 134 may include one or more anomaly dependence graphs. The anomaly dependency graph 136 is described in more detail below with reference to FIGS. 1b and 1c. The program data 134 may be located on the server 130 and can be accessed via the network 160. In accordance with an embodiment of the invention, the program data 134 may be located on one or a plurality of servers 130.

The multi-modal anomaly detection program 138 is a program capable of receiving input from the primary sensor 110 and/or the secondary sensors 120a-120c and detecting an anomaly in the device 140 using multiple sensors, i.e. the primary sensor 110 and the secondary sensors 120a-120c. The multi-modal anomaly detection program 138 may generate and use the anomaly dependency graph 136 to detect an anomaly in the device 140. The multi-modal anomaly detection program 138 may receive the primary sensor data 114 and the secondary sensor data 124a-124c, which may be received and/or collected by the server 130 and stored as the program data 134 in the program database 132. The multi-modal anomaly detection program 138 and the anomaly dependency graph 136 are described in more detail below with reference to FIG. 1b.

The device 140 may be any device capable of emitting, producing, and/or generating audio, visual, textual, and/or physical data. For example, the device 140 may be, but is not limited to, an engine which produces sound waves, which may be collected to analyze the normal operation of the engine. As another example, the device 140 may be, but is not limited to, a compressor, elevator motor, and/or HVAC device which produces sounds or vibrations which may be collected and analyzed to check the device is functioning properly in the environment. While only a single device 140 is depicted, it can be appreciated that any number of devices may be part of the multi-modal anomaly detection system 100. In some embodiments, the device 140 includes a collection of devices, device parts, and/or data sources. The device 140 is described in more detail with reference to FIG. 4.

The user device 150 may include the user interface 152. In the example embodiment, the user device 150 may be a cellphone, desktop computer, a notebook, a laptop computer, a tablet computer, a thin client, or any other electronic device or computing system capable of storing compiling and organizing audio, visual, textual, or physical content and receiving and sending that content to and from other devices, such as the primary sensor 110, the secondary sensors 120a-120c, the server 130, and the device 140 via the network 160. While only a single user device 150 is depicted, it can be appreciated that any number of user devices may be part of the multi-modal anomaly detection system 100. In some embodiments, the user device 150 includes a collection of devices or data sources. The user device 150 is described in more detail with reference to FIG. 4.

The user interface 152 includes components used to receive input from a user on the user device 150 and transmit the input to the multi-modal anomaly detection program 138 residing on server 130, or conversely to receive information from the multi-modal anomaly detection program 138 and display the information to the user on user device 150. In an example embodiment, the user interface 152 uses a combination of technologies and devices, such as device drivers, to provide a platform to enable users of the user device 150 to interact with the multi-modal anomaly detection program 138. In the example embodiment, the user interface 152 receives input, such as but not limited to, textual, visual, or audio input received from a physical input device, such as but not limited to, a keypad and/or a microphone.

Figure 1B:
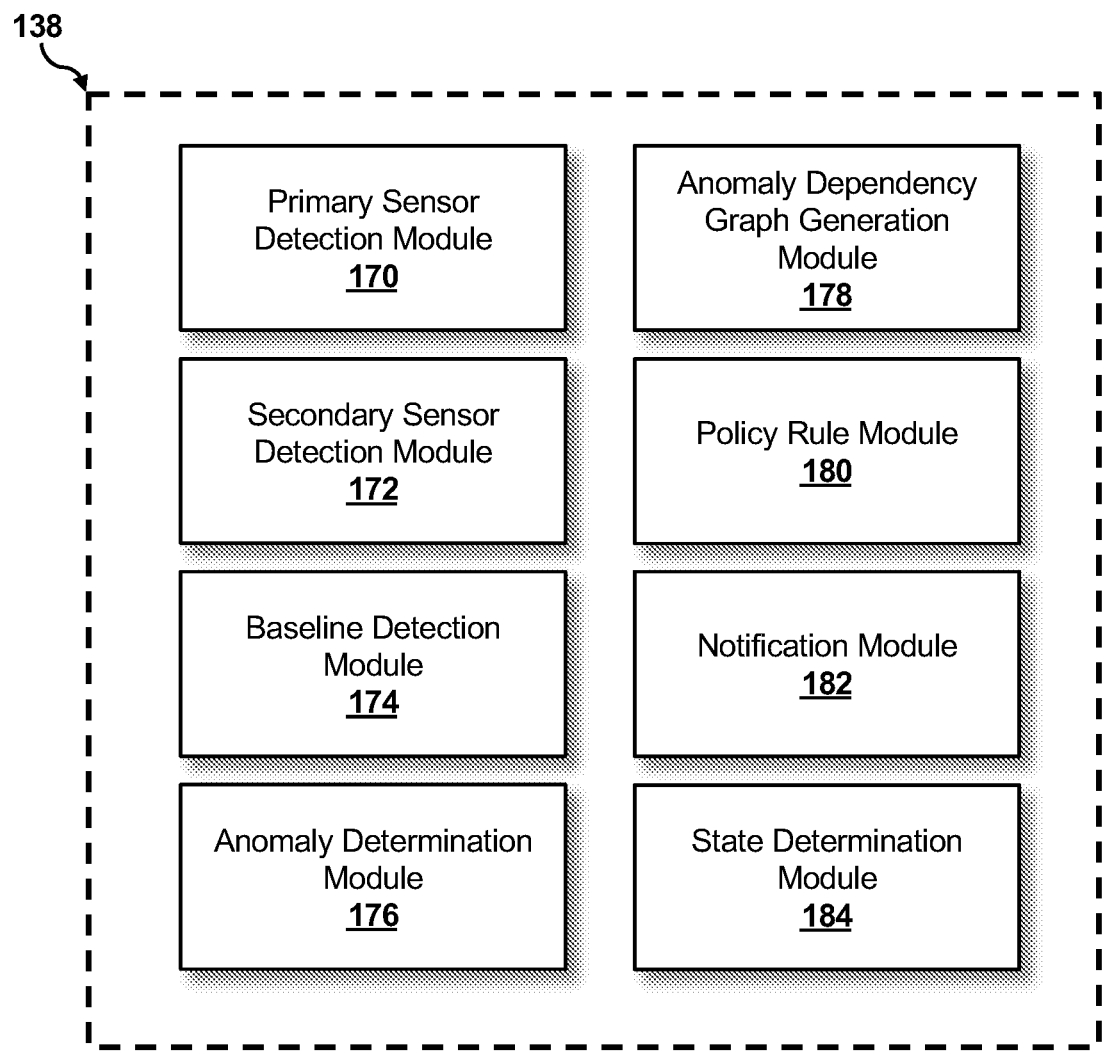

FIG. 1b illustrates example modules of the multi-modal anomaly detection program 138. In an example embodiment, the multi-modal anomaly detection program 138 may include eight modules: primary sensor detection module 170, secondary sensor detection module 172, baseline detection module 174, anomaly determination module 176, anomaly dependency graph generation module 178, policy rule module 180, notification module 182 and state determination module 184.

The primary sensor detection module 170 receives the primary sensor data 114 stored as the program data 134 from the program database 132. For example, the primary sensor detection module 170 may receive, but not limited to, audio data of the device 140 and the surroundings of the device 140, video data of the device 140 and the surroundings of the device 140, temperature data of the device 140 and the surroundings of the device 140, door sensor data of the device 140 and the surroundings of the device 140, and/or presence detection data of the device 140 and the surroundings of the device 140, etc.

The secondary sensor detection module 172 receives the secondary sensor data 124a-124c stored as the program data 134 from the program database 132. For example, but not limited to, the secondary sensor detection module 172 may receive image data, presence detection data, and/or door sensor data of the device 140 and the surroundings of the device 140.

The baseline detection module 174 receives the primary sensor data 114 stored as program data 134 from the program database 132. The baseline detection module 174 determines the baseline characteristics of the primary sensor data 114 for the device 140. The baseline characteristics may include, but are not limited to, the normal sound characteristics of the device 140. For example, the device 140 may be, but is not limited to, a vehicle engine and the primary sensor 110 may be, but is not limited to, an acoustic monitoring device, and the baseline detection module 174 may receive the audio data of a normally operating device 140 and determine the baseline acoustic characteristics of the device 140. The baseline detection module 174 may operate continuously or for a set period of time. While acoustic data is used as the example for the baseline characteristics of the device 140, it can be appreciated that any type of data contained within the program data 134 received from the primary sensor 110 may be used to determine the baseline characteristics of the device 140. Further, the baseline detection module 174 may determine one or more baseline characteristics for the device 140, such as, but not limited to, an acoustic baseline, a visual baseline, a temperature baseline, a pressure baseline, etc. depending on the device 140.

The anomaly determination module 176 receives the primary sensor data 114 stored as the program data 134 from the program database 132 and determines the source of the primary sensor data 114. For example, the anomaly determination module 176 determines if the primary sensor data 114 is associated with the device 140 or is received from a source other than the device 140, i.e. the surroundings of the device 140. The anomaly determination module 176 compares the primary sensor data 114 received from the device 140 to the baseline characteristics for the device 140 to determine any anomalies in the primary sensor data 114, i.e. differences in the primary sensor data 114 from the baseline characteristics. The anomaly determination module 176 also receives the secondary sensor data 124a-124c and determines the source of the secondary sensor data 124a-124c, which may also indicate an anomaly. For example, but not limited to, the primary sensor data 114 may indicate an acoustic anomaly for the device 140, i.e. a sound outside the baseline acoustic characteristics for the device 140. Further, the secondary sensor data 124a-124c may indicate, for example, but not limited to, an image anomaly, a pressure anomaly, a temperature anomaly, a perimeter anomaly, etc.

The anomaly dependency graph generation module 178 receives the anomalies detected by anomaly determination module 176 and generates the anomaly dependency graph 136. The anomaly dependency graph 136 defines the relationship between the baseline characteristics, the primary sensor data 114, which indicates an anomaly from the baseline, and the secondary sensor data 124a-124c of the device 140. For example, but not limited to, the primary sensor data 114 may indicate an acoustic anomaly for the device 140, i.e. a sound outside the baseline acoustic characteristics for the device 140. Further, the secondary sensor data 124a-124c may indicate, for example, but not limited to, an image anomaly, a pressure anomaly, a temperature anomaly, a perimeter anomaly, etc.

The anomalies between different modalities, i.e. sensors, may have a complex relationship. The primary sensor 110 and the secondary sensors 120a-120c may all show abnormal behavior together which may be a spurious anomaly. For example, the secondary sensor 120a may be, but is not limited to, an imaging device which captures the secondary sensor data 124a, which may be, but is not limited to, image data. The anomaly determination module 176 may determine an anomaly is present in the secondary sensor data 124a such as, but not limited to, extra people in the surroundings of the device 140. Further, the secondary sensor 120b may be, but is not limited to, an acoustic detection device which captures the secondary sensor data 124b, which may be, but is not limited to, audio data. The anomaly determination module 176 may determine an anomaly is present in the secondary sensor data 124b such as, but not limited to, a conversation in the surroundings of the device 140. If the device 140 is an engine, these anomalies would be spurious anomalies as they are not sounds from the engine itself, i.e. the device 140. As another example, the secondary sensor 120a may be, but is not limited to, an imaging device which may capture secondary sensor data 120a, which the anomaly determination module 176 determines shows the device 140 vibrating more than usual, and the primary sensor data 114 may be determined to indicate an acoustic anomaly by the anomaly determination module 176, which would be a valid anomaly and needs to be reported, i.e. the anomaly detected by the secondary sensor 120a supports the anomaly detected by the primary sensor 110. The anomaly dependency graph 136 captures the relationship between the anomalies captured by the primary sensor 110 and the secondary sensors 120a-120c, and how an anomaly detected by the primary sensor 110 is affected by the secondary sensors 120a-120c, and vice versa.

Figure 1C:
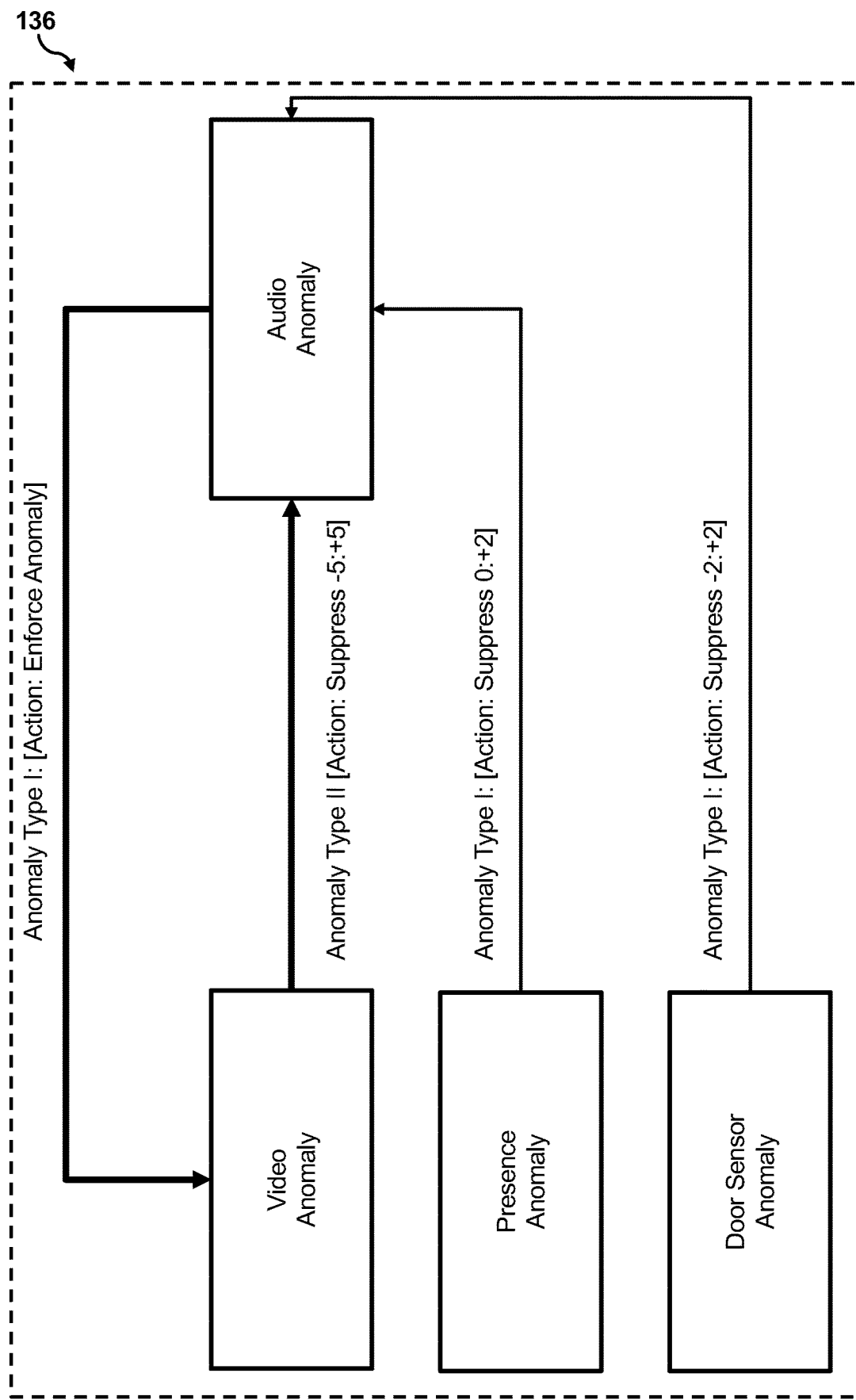
FIG. 1c illustrates an example anomaly dependence graph in accordance with an embodiment of the invention.

In an example embodiment, the anomaly dependency graph 136 may consist of, but is not limited to, vertices that mark a sensor, i.e. the primary sensor 110, in which an anomaly is detected, and links which may contain a set of policies that are dependent on the type of anomaly being reported, an action, and some parameters for the action. The policies are described in more detail below with reference to the policy rule module 180. An example of the anomaly dependency graph 136 is shown in FIG. 1c. The source vertex in the graph, containing the video anomaly, presence anomaly, and door sensor anomaly, would typically be a supporting modality, i.e. one or more of the secondary sensors 120a-120c, and the target vertex, containing the audio anomaly, would be the main modality, i.e. the primary sensor 110. However, one can also construct other graphs in which the target vertex is a supporting modality and the graph has multiple links from a supporting modality to the main modality. The anomaly types, the actions, and the parameters for the action are described in more detail below with reference to the policy rule module 180.

This anomaly dependency graph 136 may be used by the multi-modal anomaly detection system 100 as a way to control when anomalies determined by the primary sensor 110, e.g. and acoustic analytics device, should be reported and when they should be suppressed. By incorporating the anomaly dependency graph 136 into the multi-modal anomaly detection system 100, spurious anomalies can be eliminated, and the multi-modal anomaly detection system 100 can be made more precise. Further, having the multi-modal anomaly detection system 100 using the anomaly dependency graph 136 has several advantages such as, but not limited to, allowing the multi-modal anomaly detection system 100 with the same set of secondary sensors 120a-120c to be configured differently in different environments. For example, in some environments, secondary sensor 120a may be a single imaging device may be suitable for monitoring an engine, while in other environments multiple secondary sensors 120a-120c, e.g. multiple imaging devices may be required. The definition of the relationships and using the secondary sensors 120a-120c to suppress or enhance the operation of the primary sensor 110 enables the multi-modal anomaly detection system 100 to be configured and reused in many different environments.

The policy rule module 180 defines an action and parameters for the action based on the type of anomaly being detected by the anomaly determination module 176 and the relationships defined by the anomaly dependency graph 136. For example, the policy rule module 180 may define an action such as, but not limited to, suppressing the output of the primary sensor 110 and/or the secondary sensors 120a-120c, and/or turning off the primary sensor 110 and/or the secondary sensors 120a-120c. Thus, the policy rule module 180 may define actions which may suppress an anomaly by suppressing or turning off the primary sensor 110 and/or the secondary sensors 120a-120c and/or enforcing the anomaly by correlating the anomalies detected by the primary sensor 110 and the secondary sensors 120a-120c. The parameters for the action may include, but are not limited to, how long to suppress or turn off the primary sensor 110 and/or the secondary sensors 120a-120c when anomaly is detected by the primary sensor 110 and/or the secondary sensors 120a-120c. For example, the device 140 may be an engine located in an engine room, the primary sensor 110 may be an acoustic monitoring device, the secondary sensor 120a may be a video camera, the secondary sensor 120b may be a presence sensor, and the secondary sensor 120c may be a door sensor. The primary sensor 110 may detect an acoustic anomaly and the secondary sensor 120a may simultaneously detect another type of anomaly, e.g. the number of objects in view has changed. In this instance, the policy rule module 180 would define an action to suppresses the primary sensor 110 for five minutes before and five minutes after the video anomaly is detected by the secondary sensor 120a because the anomaly detected by the secondary sensor 120a accounts for the anomaly detected by the primary sensor 110, i.e. the device 140 is not the source of the acoustic anomaly. On the other hand, if the secondary sensor 120a detects another type of anomaly, e.g. the device 140 is vibrating, the policy rule module 180 would define an action to, for example, but not limited to, reinforce, confirm, and/or increase the confidence of the acoustic anomaly detected by the primary sensor 110 because the anomaly detected by the secondary sensor 120a supports the anomaly detected by the primary sensor 110, i.e. the device 140 is the source of the acoustic anomaly.

The policy rule module 180 may view the anomalies reported by each of the primary sensor 110 and the secondary sensors 120a-120c as a time-series with two attributes, one being the anomaly detected by the primary sensor 110, i.e. the target modality, and the other being the anomaly detected by the secondary sensors 120a-120c, i.e. the source modality. An illustrative normal baseline example is shown below in Table 1.

TABLE 1

| Time   | 0 | 1 | 2 | 3 | 4 | 5 | 6 | 7 | 8 | 9 | 10 |
|--------|---|---|---|---|---|---|---|---|---|---|----|
| Source | 0 | 0 | 0 | 1 | 1 | 1 | 0 | 0 | 0 | 0 | 0  |
| Target | 0 | 0 | 1 | 1 | 1 | 1 | 1 | 0 | 0 | 0 | 1  |

The policy rule module 180 may identify the cluster of is in each of the series which are reporting the anomaly, and then compare the two clusters. Referring to Table 1, the cluster of is in the source modality, i.e. the secondary sensors 120a-120c, is accompanied by a cluster of is in the target modality, i.e. the primary sensor 110, 1 time-unit before the start of the source modality and runs for 1 time-unit after the source modality ends, as shown at times 2-6. Thus, the policy rule module 180 determines that the parameters would be to suppress the primary sensor 110, i.e. the target modality, for 1 time-unit before and 2 time-units after the end of the secondary sensors 120a-120c, i.e. the source modality. Therefore, the two anomalies, the ones detected by the primary sensor 110 and the anomaly detected by the secondary sensors 120a-120c, in the time-series would be correlated. The policy rule module 180 may calculate the correlations between the two series and the time period during which the correlation remains strong. The policy rule module 180 determines when the primary sensor 110, i.e. the target modality, should be suppressed, if the secondary sensors 120a-120c, i.e. the source modality is turned on. A time expansion or compression may also be needed to properly capture the end point of the correlation. If no correlation between the primary sensor 110 and the secondary sensors 120a-120c can be determined, the policy rule module 180 would determine that the primary sensor 110 and the secondary sensors 120a-120c are independent. In that case, the primary sensor 110 should not have any linkage with the secondary sensors 120a-120c. If the primary sensor 110 and the secondary sensors 120a-120c have a negative correlation, the anomalies detected would be reported only if the primary sensor 110 and the secondary sensors 120a-120c show the anomaly. The policy rule module 180 may perform the same analysis for all pair-wise primary sensors 110 and secondary sensors 120a-120c to determine the relationship between the different sensors, the links that should be in the anomaly dependency graph 136, and the policies with the parameters that ought to be used on each link.

The policy rule module 180 may be pre-configured to define the parameters for the actions or determine the parameters for the actions dynamically. For dynamic learning of the parameters, the primary sensor 110 can look at the time-period or range over which the anomaly is present in the primary sensor data 114 to determine the appropriate time-threshold or other parameters. Further, the policy rule module 180 may be configured to automatically learn the value of parameters associated with each secondary sensor 120a-120c, i.e. supporting modalities, and the primary sensor 110, i.e. the target modality, in order to reduce false positives. The policy rule module 180 may determine the policies during the baseline detection process, described in detail above with reference to the baseline detection module 174, by automatically suppressing any anomalies that are reported during the baseline period. Thus, the multi-modal anomaly detection system 100 may learn those patterns of activations where any anomalies are detected and then to determine what may be causing those anomalies.

The notification module 182 generates a notification that an anomaly has been detected for the device 140 to a user on the user device 150 via the user interface 152. The notification may include, but is not limited to, an alert that the primary sensor 110 has detected an anomaly in the device 140 and/or the secondary sensors 120a-120c have detected an anomaly in the device 140.

The state determination module 184 compares the primary sensor data 114 and the secondary sensor data 124a-124c for the device 140 to the baseline determined to the device 140 to detect the general state of the device 140. While the multi-modal anomaly detection system 100 may detect and analyze an anomaly in the device 140, the multi-modal anomaly detection system 100 may also classify the general state of the device 140.

Figure 2A:
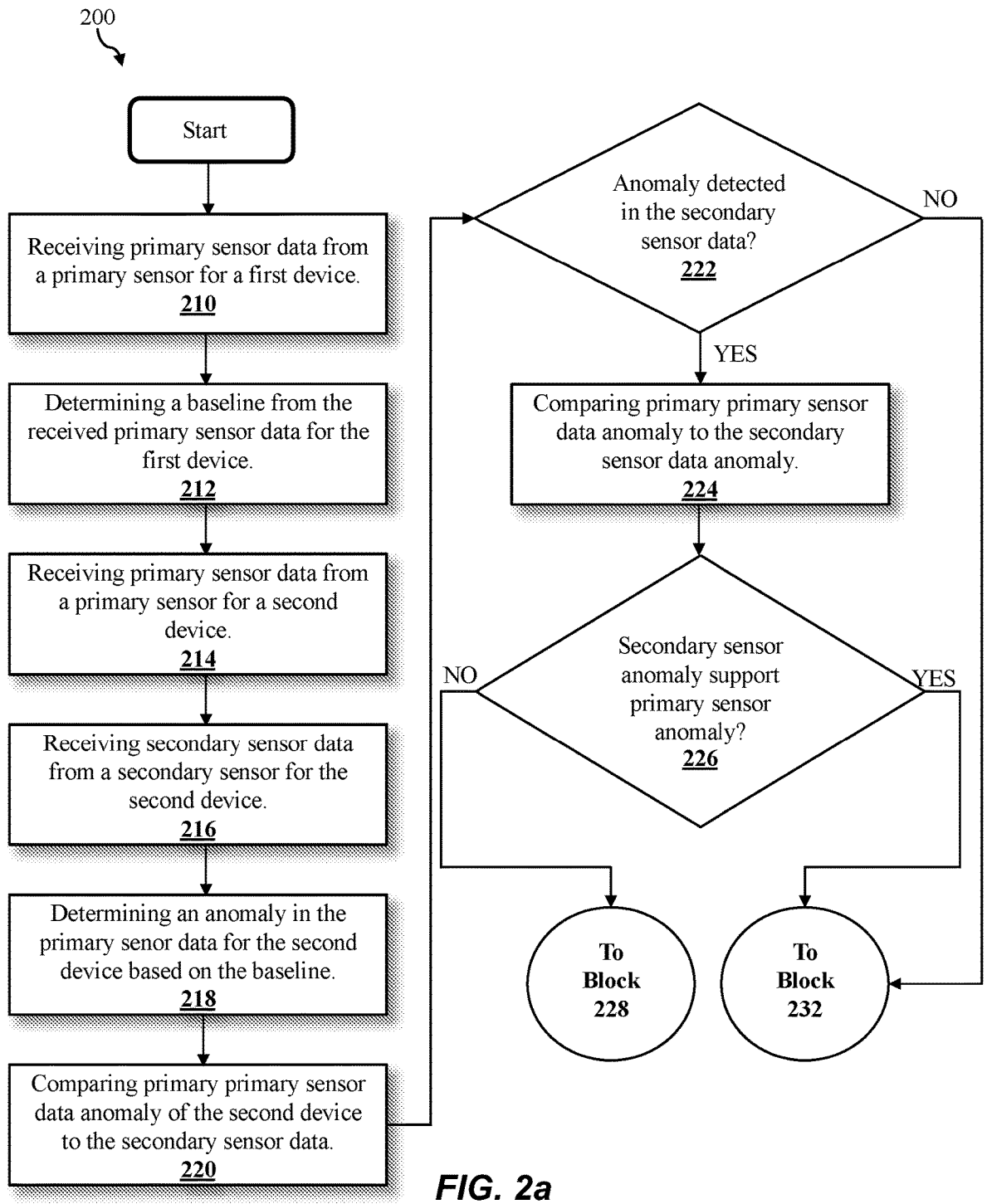
FIG. 2a is a flowchart illustrating an example method of the multi-modal anomaly detection in accordance with an embodiment of the invention.
Figure 2B:
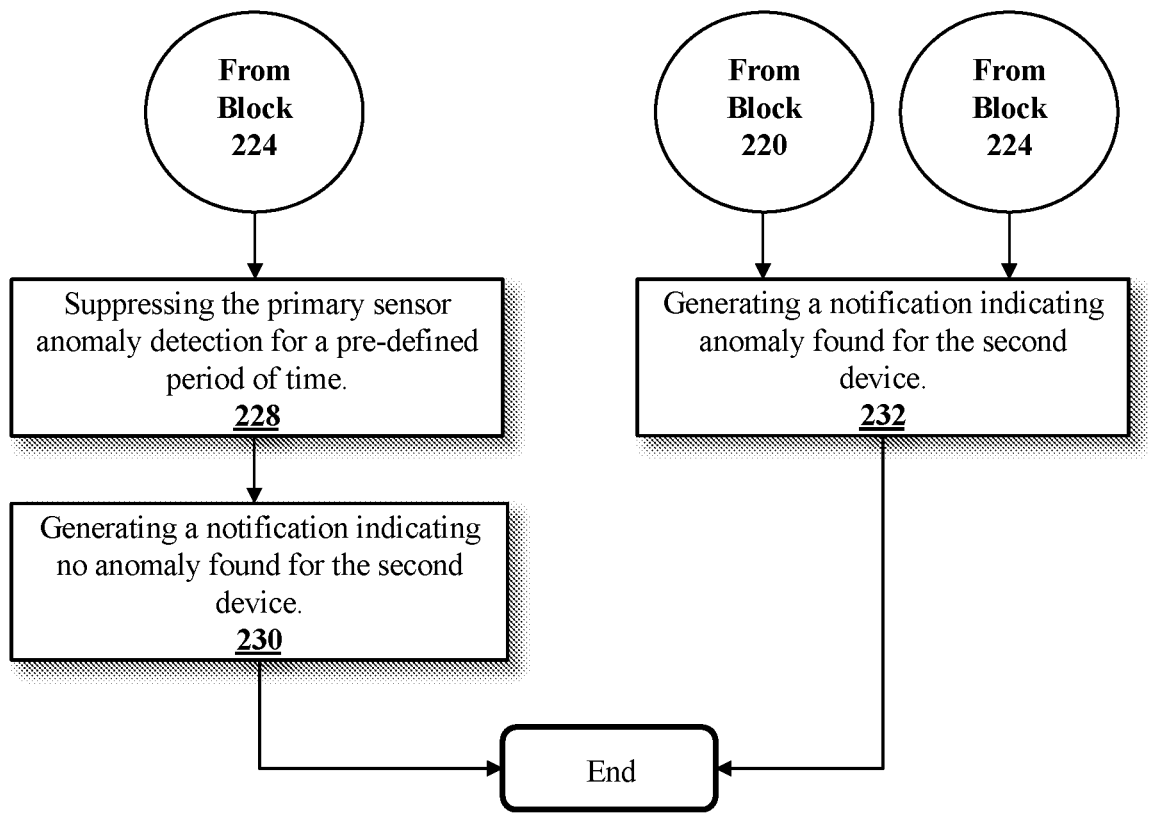
FIG. 2b is a flowchart illustrating an example method of the multi-modal anomaly detection in accordance with an embodiment of the invention.

Referring to FIGS. 2a and 2b, a method 200 for multi-modal anomaly detection is depicted, in accordance with an embodiment of the present invention.

Referring to block 210, the primary sensor detection module 170 receives the primary sensor data 114 of a first device 140 from the primary sensor 110. Primary sensor data retrieval is described in more detail above with reference to FIG. 1b with reference to the primary sensor detection module 170.

Referring to block 212, the baseline detection module 174 receives the primary sensor data 114 stored as program data 134 from the program database 132 and determines the baseline characteristics of the primary sensor data 114 for the device 140. Baseline detection of the device 140 is described in more detail above with reference to the baseline detection module 174.

Referring to block 214, the primary sensor detection module 170 receives the primary sensor data 114 of a second device 140, the second device 140 being the same type of device as the first device 140 from the primary sensor 110. Primary sensor data retrieval is described in more detail above with reference to the primary sensor detection module 170.

Referring to block 216, the secondary sensor detection module 172 receives the secondary sensor data 124a-124c of a second device 140, the second device 140 being the same type of device as the first device 140 from the secondary sensors 120a-120c. Secondary sensor data retrieval is described in more detail above with reference to the secondary sensor detection module 172.

Referring to block 218, the anomaly determination module 176 receives the primary sensor data 114 stored as the program data 134 from the program database 132 and compares the primary sensor data 114 to the baseline characteristics for the device 140 to determine any anomalies in the primary sensor data 114, i.e. differences in the primary sensor data 114 from the baseline characteristics. Anomaly determination is described in more detail above with reference the anomaly determination module 176.

Referring to block 220, the anomaly determination module 176 receives the secondary sensor data 124a-124c from the second device 140 and compares the secondary sensor data 124a-124c of the second device 140 to the primary sensor data 114 of the second device 140.

Referring to block 222, the multi-modal anomaly detection system 100 determines if an anomaly is detected in the secondary sensor data 124a-124c for the second device 140. Secondary anomaly comparison is described in more detail above with reference the anomaly determination module 176.

If the multi-modal anomaly detection system 100 determines that an anomaly is detected in the secondary sensor data 124a-124c, the multi-modal anomaly detection system 100 proceeds to block 224. Referring to block 224, the anomaly dependency graph generation module 178 receives the primary sensor data 114 stored as the program data 134 from the program database 132 and compares the primary sensor data 114 to the secondary sensor data 124a-124c and generates the anomaly dependency graph 136. Primary sensor data 114 and secondary sensor data 124a-124c comparison is described in more detail above with reference the anomaly dependency graph generation module 178. If the multi-modal anomaly detection system 100 determines that no anomaly is detected in the secondary sensor data 124a-124c, the multi-modal anomaly detection system 100 proceeds to block 232 as described in more detail below.

Referring to block 226, the anomaly dependency graph generation module 178 determines if the anomaly detected by the secondary sensors 120a-120c supports the anomaly detected by the primary sensor 110. If the anomaly dependency graph generation module 178 determines that the anomaly detected by the secondary sensors 120a-120c does support the anomaly detected by the primary sensor 110, the multi-modal anomaly detection system 100 proceeds to block 232. If the anomaly dependency graph generation module 178 determines that the anomaly detected by the secondary sensors 120a-120c does not support the anomaly detected by the primary sensor 110, the multi-modal anomaly detection system 100 proceeds to block 228.

Referring to block 228, the policy rule module 180 suppresses the primary sensor 110 according the anomaly dependency graph 136. Primary sensor 110 suppression is described in more detail above with reference to the policy rule module 180.

Referring to block 230, the notification module 182 generates a notification that no anomaly has been detected for the device 140 to a user on the user device 150 via the user interface 152. Anomaly notification is described in more detail above with reference to the notification module 182.

Referring to block 232, the notification module 182 generates a notification that an anomaly has been detected for the device 140 to a user on the user device 150 via the user interface 152. Anomaly notification is described in more detail above with reference to the notification module 182.

Figure 3:
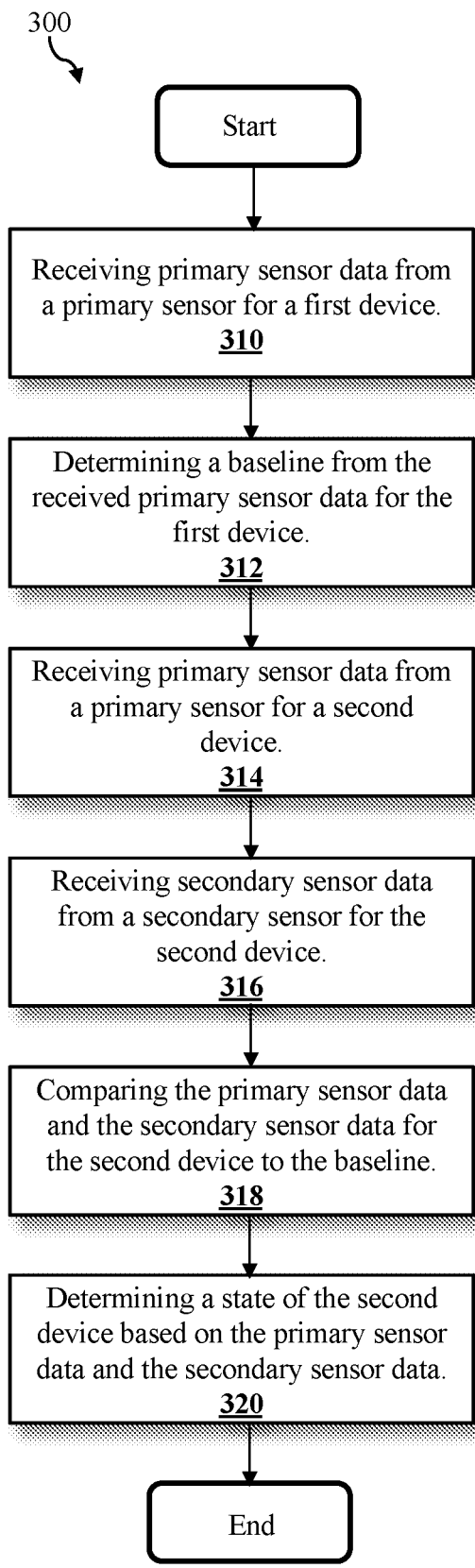
FIG. 3 is a flowchart illustrating an example method of the multi-modal anomaly detection in accordance with an embodiment of the invention.

Referring to FIG. 3, a method 300 for multi-modal anomaly detection is depicted, in accordance with an embodiment of the present invention. Block 310-316 are identical to blocks 210-216, respectively.

Referring to block 318, the state determination module 184 compares the primary sensor data 114 and the secondary sensor data 124a-124c for the device 140 to the baseline determined to the device 140 to detect the general state of the device 140 at block 320. Device state determination is described in more detail above with reference to the state determination module 184.

Figure 4:
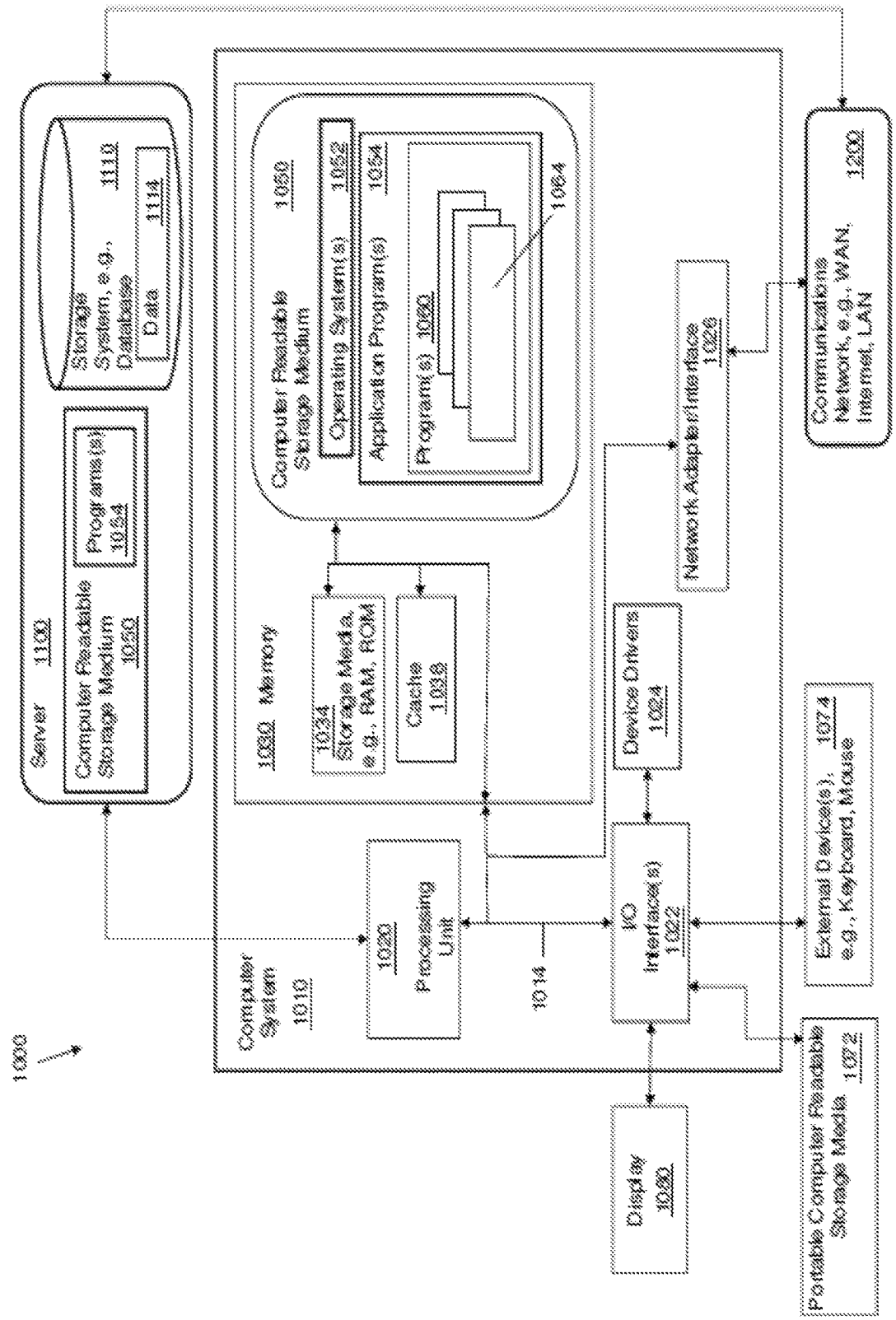
FIG. 4 is a block diagram depicting the hardware components of the multi-modal anomaly detection system of FIG. 1, in accordance with an embodiment of the invention.

Referring to FIG. 4, a system 1000 includes a computer system or computer 1010 shown in the form of a generic computing device. The methods 200 and 300 for example, may be embodied in a program(s) 1060 (FIG. 4) embodied on a computer readable storage device, for example, generally referred to as memory 1030 and more specifically, computer readable storage medium 1050 as shown in FIG. 4. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

The methods 200 and 300 of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 4 becomes specifically configured to implement mechanisms of the illustrative embodiments and specifically configured to perform the operations and generated the outputs of described herein for determining a route based on a user's preferred environmental experiences.

The methods 200 and 300 (FIGS. 2a, 2b, and 3), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 170-184 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
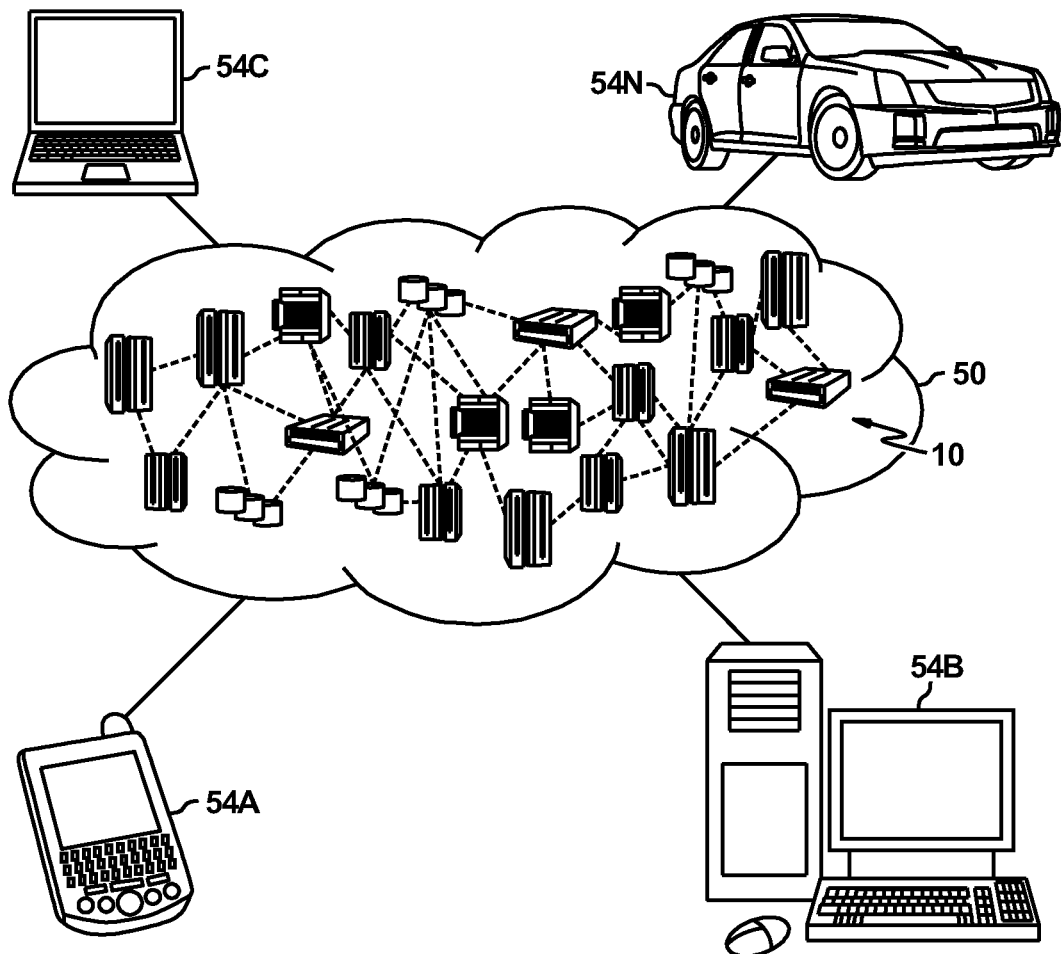
FIG. 5 illustrates a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
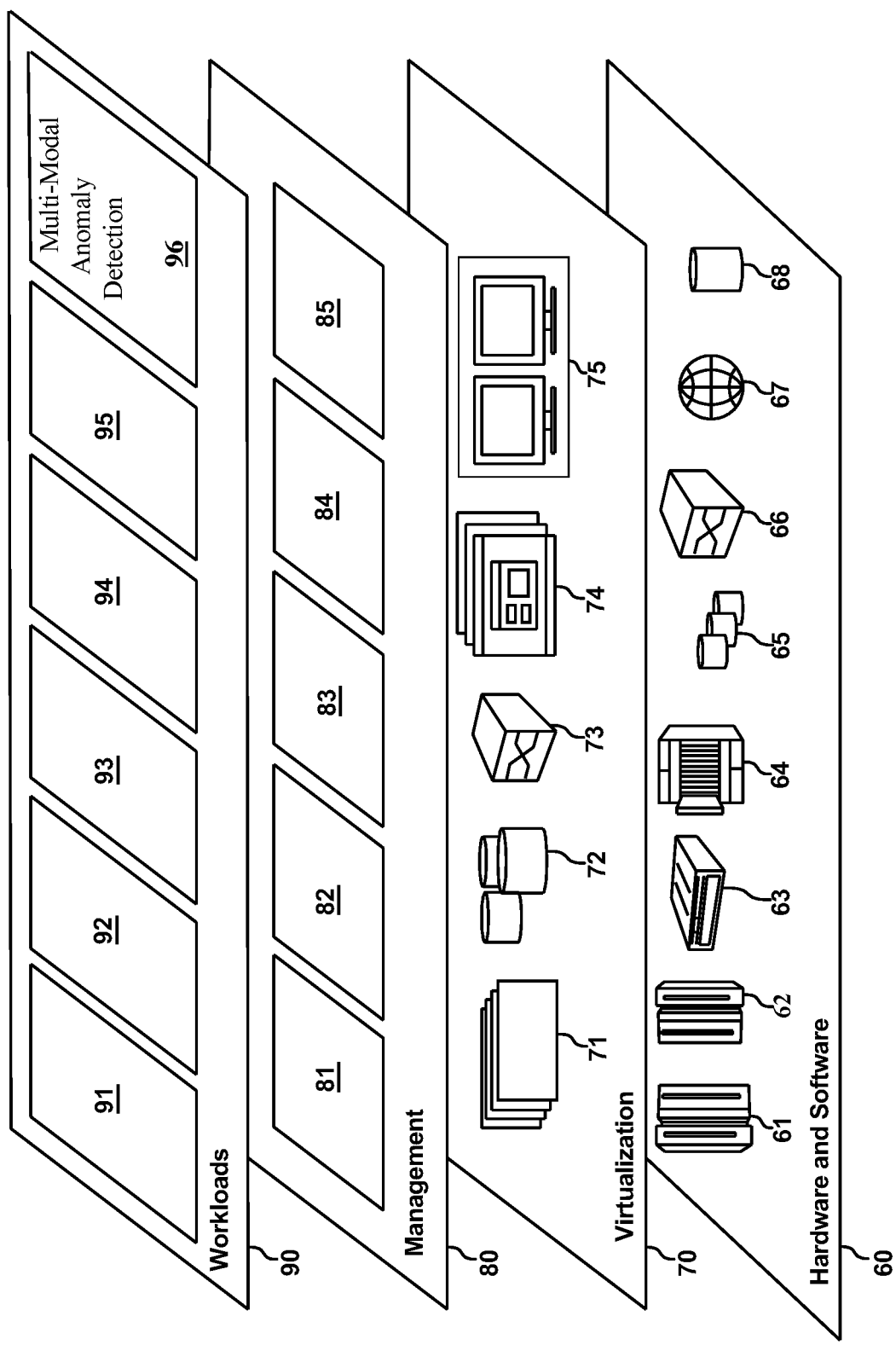
FIG. 6 illustrates a set of functional abstraction layers provided by the cloud computing environment of FIG. 5, in accordance with an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-modal anomaly detection 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for multi-modal anomaly detection, the method comprising:
   receiving, by a computing device, primary sensor data from a primary sensor for a first device;
   determining, by the computing device, a baseline from the primary sensor data for the first device
   receiving, by a computing device, primary sensor data from a primary sensor for a second device;
   receiving, by a computing device, secondary sensor data from a secondary sensor for the second device;
   determining, by a computing device, an anomaly in the primary sensor data for the second device based on the determined baseline for the first device; and
   comparing, by a computing device, the anomaly in the primary sensor data for the second device to the received secondary sensor data for the second device.

2. The method as in claim 1, further comprising:
   comparing, by the computing device, in response to detecting an anomaly in the secondary sensor data for the second device the anomaly in the primary sensor data of the second device to the anomaly in the secondary sensor data for the second device; and
   suppressing, by the computing device, the primary sensor in response to determining that the anomaly in the secondary sensor data does not support the anomaly in the primary sensor data for the second device.

3. A method as in claim 1, wherein the comparing, by a computing device, the anomaly in the primary sensor data for the second device to the received secondary sensor data for the second device further comprises:
   creating, by the computing device, an anomaly dependency graph, wherein the anomaly dependency graph captures the relationships between the anomaly in the primary sensor data and the secondary sensor data.

4. The method of claim 1, further comprising:
   generating, by the computing device, a notification indicating no anomaly was found for the second device.

5. A method as in claim 1, further comprising:
   comparing, by the computing device, in response to detecting an anomaly in the secondary sensor data for the second device the anomaly in the primary sensor data of the second device to the anomaly in the secondary sensor data for the second device; and
   generating, by the computing device, a notification that an anomaly was found in the second device in response to determining that the anomaly in the secondary sensor data does support the anomaly in the primary sensor data for the second device.

6. A method as in claim 1, further comprising:
   generating, by the computing device, a notification that an anomaly was found in the second device in response to determining that no anomaly was detected in the secondary sensor data for the second device.

7. A method as in claim 1, wherein the primary sensor is an acoustic analytics device.

8. A method as in claim 1, wherein the secondary sensor device comprises at least one of the group consisting of: an imaging device, a presence sensor device, and a door sensor device.

9. A computer program product for multi-modal anomaly detection, the computer program product comprising:
   a computer-readable storage medium having program instructions embodied therewith, wherein the computer readable storage medium is not a transitory signal per se, the program instructions comprising:
      program instructions to receive, by a computing device, primary sensor data from a primary sensor for a first device;
      program instructions to determine, by the computing device, a baseline from the primary sensor data for the first device
      program instructions to receive, by a computing device, primary sensor data from a primary sensor for a second device;

program instructions to receive, by a computing device, secondary sensor data from a secondary sensor for the second device;
program instructions to determine, by a computing device, an anomaly in the primary sensor data for the second device based on the determined baseline for the first device; and
program instructions to compare, by a computing device, the anomaly in the primary sensor data for the second device to the received secondary sensor data for the second device.

10. The computer program product as in claim 9, further comprising:
program instructions to compare, by the computing device, in response to detecting an anomaly in the secondary sensor data for the second device the anomaly in the primary sensor data of the second device to the anomaly in the secondary sensor data for the second device; and
program instructions to suppress, by the computing device, the primary sensor in response to determining that the anomaly in the secondary sensor data does not support the anomaly in the primary sensor data for the second device.

11. The computer program product of claim 9, further comprising:
program instructions to generate, by the computing device, a notification indicating no anomaly was found for the second device.

12. The computer program product as in claim 9, further comprising:
program instructions to compare, by the computing device, in response to detecting an anomaly in the secondary sensor data for the second device the anomaly in the primary sensor data of the second device to the anomaly in the secondary sensor data for the second device; and
program instructions to generate, by the computing device, a notification that an anomaly was found in the second device in response to determining that the anomaly in the secondary sensor data does support the anomaly in the primary sensor data for the second device.

13. The computer program product as in claim 9, further comprising:
program instructions to generate, by the computing device, a notification that an anomaly was found in the second device in response to determining that no anomaly was detected in the secondary sensor data for the second device.

14. The computer program product as in claim 9, wherein the comparing, by a computing device, the anomaly in the primary sensor data for the second device to the received secondary sensor data for the second device further comprises:
creating, by the computing device, an anomaly dependency graph, wherein the anomaly dependency graph captures the relationships between the anomaly in the primary sensor data and the secondary sensor data.

15. A computer system for multi-modal anomaly detection, the system comprising:
one or more computer processors, one or more computer-readable storage media, and program instructions stored on one or more of the computer-readable storage media for execution by at least one of the one or more processors, the program instructions comprising:
program instructions to receive, by a computing device, primary sensor data from a primary sensor for a first device;
program instructions to determine, by the computing device, a baseline from the primary sensor data for the first device program instructions to receive, by a computing device, primary sensor data from a primary sensor for a second device;
program instructions to receive, by a computing device, secondary sensor data from a secondary sensor for the second device;
program instructions to determine, by a computing device, an anomaly in the primary sensor data for the second device based on the determined baseline for the first device; and
program instructions to compare, by a computing device, the anomaly in the primary sensor data for the second device to the received secondary sensor data for the second device.

16. The computer system as in claim 15, further comprising:
program instructions to compare, by the computing device, in response to detecting an anomaly in the secondary sensor data for the second device the anomaly in the primary sensor data of the second device to the anomaly in the secondary sensor data for the second device; and
program instructions to suppress, by the computing device, the primary sensor in response to determining that the anomaly in the secondary sensor data does not support the anomaly in the primary sensor data for the second device.

17. The computer system of claim 15, further comprising:
program instructions to generate, by the computing device, a notification indicating no anomaly was found for the second device.

18. The computer system as in claim 15, further comprising:
program instructions to compare, by the computing device, in response to detecting an anomaly in the secondary sensor data for the second device the anomaly in the primary sensor data of the second device to the anomaly in the secondary sensor data for the second device; and
program instructions to generate, by the computing device, a notification that an anomaly was found in the second device in response to determining that the anomaly in the secondary sensor data does support the anomaly in the primary sensor data for the second device.

19. The computer system as in claim 15, further comprising:
program instructions to generate, by the computing device, a notification that an anomaly was found in the second device in response to determining that no anomaly was detected in the secondary sensor data for the second device.

20. The computer system as in claim 15, wherein the comparing, by a computing device, the anomaly in the primary sensor data for the second device to the received secondary sensor data for the second device further comprises:
creating, by the computing device, an anomaly dependency graph, wherein the anomaly dependency graph captures the relationships between the anomaly in the primary sensor data and the secondary sensor data.

* * * * *